(12) United States Patent
Fukunaga

(10) Patent No.: US 7,382,538 B2
(45) Date of Patent: Jun. 3, 2008

(54) OPTICAL UNIT FOR PROJECTION DISPLAY APPARATUS AND PROJECTION DISPLAY APPARATUS

(75) Inventor: Hiroaki Fukunaga, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 137 days.

(21) Appl. No.: 11/418,147

(22) Filed: May 5, 2006

(65) Prior Publication Data

US 2006/0274422 A1    Dec. 7, 2006

(30) Foreign Application Priority Data

Jun. 6, 2005  (JP) ............................. 2005-165678

(51) Int. Cl.
*G02B 3/00* (2006.01)
*G03B 21/14* (2006.01)

(52) U.S. Cl. ...................................... 359/649; 353/101

(58) Field of Classification Search ........ 359/649–651; 353/81, 101

See application file for complete search history.

(56) References Cited

U.S. PATENT DOCUMENTS 6,000,802 A * 12/1999 Hashizume et al. .......... 353/38
6,113,240 A     9/2000 Iizuka 2003/0043468 A1   3/2003  Cha
2004/0070695 A1   4/2004  Kim
2005/0023446 A1   2/2005  Chang et al.

FOREIGN PATENT DOCUMENTS

| EP | 0 825 473 A2 | 2/1998 |
| EP | 1 453 324 A2 | 9/2004 |
| JP | 10-115799 | 5/1998 |
| JP | 2003-149597 | 5/2003 |

* cited by examiner

*Primary Examiner*—Ricky Mack
*Assistant Examiner*—William C Choi
(74) *Attorney, Agent, or Firm*—McGinn IP Law Group, PLLC

(57) ABSTRACT

An optical unit has a first lens holder holding a first lens and a second lens holder holding a second lens, the first lens holder and the second lens holder being mounted on a common lens base. The first lens holder is movable in the direction of one side of the exit end face of a light tunnel, and the second lens holder is movable in the direction of another side, adjacent to the one side, of the exit end face of a light tunnel. The first lens holder and the second lens holder are independently moved to bring an illuminating light area on a DMD, as an image forming device, into alignment with an image forming area on the DMD. The illuminating light area can thus be accurately positioned in the image forming area on the DMD. The optical unit has a high light utilization efficiency and can easily be operated for positional adjustment of the illuminating light area. The optical unit is incorporated in a projection display apparatus.

8 Claims, 12 Drawing Sheets

OPTICAL UNIT FOR PROJECTION DISPLAY APPARATUS AND PROJECTION DISPLAY APPARATUS

BACKGROUND OF THE INVENTION

1. Field of the Invention

The present invention relates to a projection display apparatus, and more particularly to an optical unit for accurately determining an area in which to project illuminating light onto an image forming device, and a projection display apparatus which incorporates such an optical unit.

2. Description of the Related Art

Projection display apparatus employing image forming devices including liquid crystal light valves, digital micromirror devices (hereinafter referred to as "DMD"), etc. have heretofore been widely used for the purposes of presentations and other image display occasions. In the projection display apparatus, the image forming device produces a light beam modulated according to an input image signal, and the modulated light beam is projected in a magnified scale onto a screen. If a light beam applied to the image forming device fails to accurately illuminate an image forming area on the image forming device, then the projection display apparatus suffers problems in that the projected image has its brightness lowered or is shaded. To solve the problems, it is the general practice to apply illuminating light which is surrounded by a certain illuminating margin to the image forming area. If the illuminating margin is large, however, much light is not applied to the image forming area, resulting in a reduction in light utilization efficiency.

JP-A No. 10-115799 discloses a projection display apparatus employing a liquid crystal light valve. The disclosed projection display apparatus has a field lens whose installed position is adjustable for accurately positioning an illuminating light area in the image forming area of the liquid crystal light valve.

Projection display apparatuses employing a DMD incorporate various technologies including a process of displacing the position of the exit end of a light tunnel to position an illuminating light area accurately in the image forming area of the DMD, a process of displacing a planar mirror inserted in an illuminating light path to position an illuminating light area accurately in the image forming area of the DMD, and a process of displacing a lens in an illuminating light path to position an illuminating light area accurately in the image forming area of the DMD.

However, conventional technologies incorporated in the projection display apparatus with the DMD suffer the following problems:

According to the process of displacing the position of the exit end of the light tunnel to position the illuminating light area accurately in the image forming area of the DMD, when the position of the exit end of the light tunnel is displaced, the position of the entrance end of the light tunnel is also displaced simultaneously, tending to bring the light applied to the light tunnel out of alignment with the optical axis of the light tunnel. When the applied light is brought out of alignment with the optical axis of the light tunnel, the projected image has luminance irregularities. Therefore, it is necessary to move the output end of the light tunnel about the point of intersection between the optical axis of the light tunnel and the applied light. Actually, however, it is not easy to provide a structure for moving the output end of the light tunnel about the point of intersection. Even if it is possible to provide such a structure, the projection display apparatus incorporating the structure still has low productivity.

According to the process of displacing the planar mirror inserted in the illuminating light path to position the illuminating light area accurately in the image forming area of the DMD, it is necessary to move the planar mirror from the starting point at the center of the light beam applied to the planar mirror. If another point is used as the starting point, then the starting point varies from direction to direction in which to move the planar mirror, resulting in a change in the length of the optical path up to the DMD. If the length of the optical path up to the DMD changes, then the illuminating light area tends to be blurred, darkening the peripheral edge of the projected image.

According to the process of displacing the lens in the illuminating light path to position the illuminating light area accurately in the image forming area of the DMD, the lens is moved in two directions, i.e., a vertical direction and a horizontal direction, i.e., a direction normal to the vertical direction. Both the image forming area of the DMD and the exit end of the light tunnel are quadrangular in shape and similar in shape to each other. However, the sides of the shapes of the image forming area of the DMD and the exit end of the light tunnel are oriented differently because the illuminating light passes through a three-dimensional light path. If the DMD has an aspect ratio of 4:3, then the shorter sides thereof are oriented vertically and the longer sides thereof are oriented horizontally, whereas both the shorter and longer sides of the shape of the exit end of the light tunnel are inclined to the vertical and horizontal directions. When the lens is moved in the two directions, i.e., the vertical direction and the horizontal direction, i.e., the direction normal to the vertical direction, the illuminating light area on the DMD is moved obliquely, and hence the directions in which the illuminating light area is moved deviate considerably from the directions of the shorter and longer sides of the DMD. Even if efforts are made to position the illuminating light area accurately in the image forming area of the DMD, it is not easy to bring the illuminating light area into alignment with the image forming area of the DMD. Consequently, the efficiency with which to achieve such area adjustment is low, and it is difficult to reduce the period of time required to perform the positional correction for the illuminating light area.

SUMMARY OF THE INVENTION

It is an object of the present invention to provide a projection display apparatus which is capable of positioning an illuminating light area accurately in the image forming area of an image display device for higher light utilization efficiency and also of allowing area adjustment to be performed with ease.

An optical unit for use in a projection display apparatus according to the present invention has a light source unit, a rectangular optical element, a first optical element, a second optical element, a first optical element moving unit for moving the first optical element, a second optical element moving unit for moving the second optical element, and an image forming device. The rectangular optical element has a first surface disposed between an entrance face and an exit face and a second surface disposed adjacent to the first surface. A light beam emitted from the rectangular optical element is applied to the first optical element. A light beam emitted from the first optical element is applied to the second optical element. The first optical element moving unit has a moving mechanism for moving the first optical element on a first principal plane thereof perpendicular to the optical axis of the first optical element in a direction parallel to a line of intersection between a plane including the first surface of the rectangular optical element and the first principal plane. The second optical element moving unit has a moving mechanism for moving the second optical element on a second principal plane thereof perpendicular to the optical axis of the second optical element in a direction parallel to a line of intersection between a plane including the second surface of the rectangular optical element and the second principal plane.

The moving mechanism of the first optical element moving unit has a first optical element holding member holding the first optical element and a first moving member. The first optical element holding member has a sliding surface slidable on a first optical element moving surface which extends substantially parallel to the line of intersection between the plane including the first surface of the rectangular optical element and the first principal plane of the first optical element and which is perpendicular to the first principal plane. The first moving member moves the sliding surface of the first optical element holding member on the first optical element moving surface in a direction parallel to the first principal plane.

The moving mechanism of the second optical element moving unit has a second optical element holding member holding the second optical element and a second moving member. The second optical element holding member has a sliding surface slidable on a second optical element moving surface which extends substantially parallel to the line of intersection between the plane including the second surface of the rectangular optical element and the second principal plane of the second optical element and which is perpendicular to the second principal plane. The second moving member moves the sliding surface of the second optical element holding member on the second optical element moving surface in a direction parallel to the second principal plane.

The optical device also has a common structure, wherein the first optical element moving unit and the second optical element moving unit are mounted on the common structure. The first optical element moving surface and the second optical element moving surface are disposed on the common structure.

The first moving member has two guide pins, a fixing screw, and an adjustment screw. The guide pins are mounted on the first optical element holding member and inserted respectively in two guide holes defined in a bottom surface of the common structure for guiding the guide pins in a direction parallel to the first principal plane. The fixing screw is mounted on the sliding surface of the first optical element holding member for fixing the sliding surface to the first optical element moving surface on the common structure. The adjustment screw is mounted on the first optical element holding member and has a tip end held in contact with an upper surface of the common structure for adjusting the positional relationship between the first optical element holding member and the common structure.

The second moving member has two guide pins, a fixing screw, and an adjustment grip. The guide pins are mounted on the second optical element holding member and inserted respectively in two guide holes defined in a bottom surface of the common structure for guiding the guide pins in a direction parallel to the second principal plane. The fixing screw is mounted on the sliding surface of the second optical element holding member for fixing the sliding surface to the second optical element moving surface on the common structure. The adjustment grip is mounted on the second optical element holding member for moving the sliding surface of the second optical element holding member slidably on the second optical element moving surface on the common structure.

The first optical element and the second optical element may have respective optical axes displaced off the optical axis of the rectangular optical element. The rectangular optical element preferably comprises a light tunnel. The image forming device may comprise a digital micromirror device.

A projection display apparatus according to the present invention incorporates the above optical unit therein.

The first optical element is movable in the direction of one side of the exit end face of the rectangular optical element, and the second optical element is movable in the direction of another side, adjacent to the one side, of the exit end face of the rectangular optical element. The first optical element and the second optical element are independently movable. When the first optical element and the second optical element are independently moved, the area of an illuminating light beam, i.e., an illuminating light area, on the image forming device, e.g., a DMD, can be brought into alignment with an image forming area on the DMD. As the first optical element and the second optical element are mounted on the common structure, any errors caused by relative movement thereof are minimized.

According to the present invention, the first optical element and the second optical element are moved parallel to a first surface of the rectangular optical element, which is positioned between entrance and exit faces thereof, and a second surface disposed adjacent to the first surface, respectively, for bringing the illuminating light area into positional alignment with the image forming area on the DMD. Consequently, the illuminating light area can accurately be positioned in the image forming area on the DMD. The optical unit has a high light utilization efficiency and can easily be operated for positional adjustment of the illuminating light area. The projection display apparatus incorporates such optical unit therein.

The above and other objects, features, and advantages of the present invention will become apparent from the following description with reference to the accompanying drawings which illustrate an example of the present invention.

DETAILED DESCRIPTION OF THE PREFERRED EMBODIMENT

Figure 1:
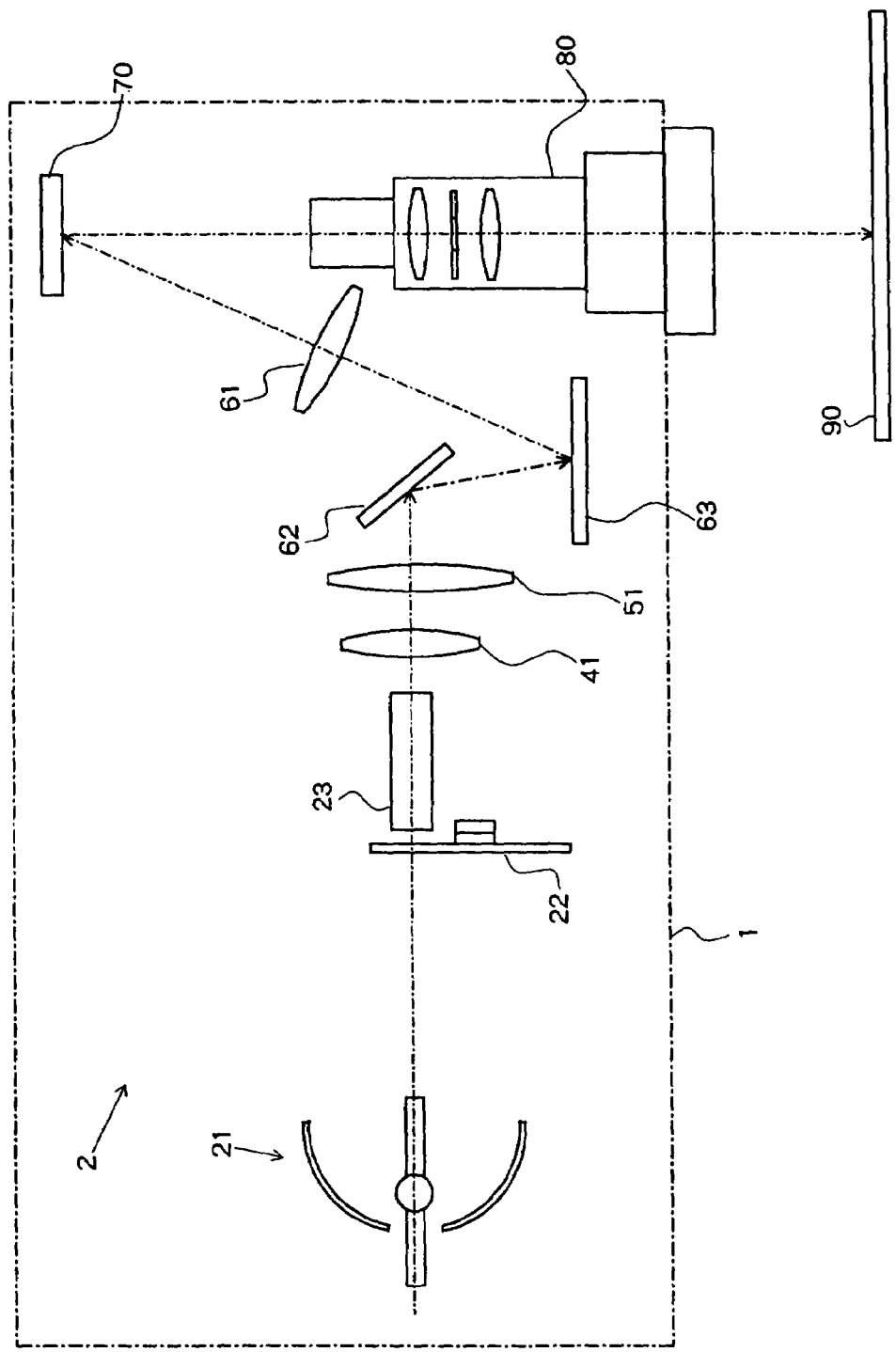
FIG. 1 is a block diagram of a projection display apparatus incorporating an optical unit according to an embodiment of the present invention.

A projection display apparatus incorporating an optical unit according to an embodiment of the present invention will be described below with reference to the drawings. As shown in FIG. 1, optical unit 2 incorporated in projection display apparatus 1 comprises an illuminating optical system, DMD 70, and projection lens 80. The illuminating optical system illuminates DMD 70. DMD 70 is a reflective optical modulator serving as an image forming device. Projection lens 80 projects a light beam from DMD 70 onto screen 90.

The illuminating optical system comprises light source unit 21, color wheel 22, light tunnel 23, and an afocal optical system.

Light source unit 21 comprises a light source having a light emitting body and a converging mirror for converging a light beam from the light source into a hypothetical secondary light source. Color wheel 22 has a plurality of color segments which can selectively be positioned at the point where the light beam from light source unit 21 converges. When color wheel 22 rotates, it separates the light beam from light source unit 21 into a plurality of colors on a time-division basis. Light tunnel 23 is a device for reducing luminance irregularities, and has an entrance end face positioned at the position for receiving the light beam that has passed through color wheel 22. Light tunnel 23 uniformizes the luminance distribution of the light beam from light source unit 21 and emits the luminance-uniformized light beam from an exit end face thereof. The afocal optical system guides the light beam emitted from light tunnel 23 to DMD 70. According to the illustrated embodiment, light tunnel 23 comprises an optical device in the shape of a hollow quadrangular prism.

DMD 70 as an image forming device has a quadrangular image forming area. Therefore, light tunnel 23 is in the shape of a hollow quadrangular prism for causing an illuminating light beam applied to DMD 70 to have a quadrangular area on the quadrangular image forming area of DMD 70. Light tunnel 23 has reflective inner wall surfaces for repeatedly reflecting the light beam that has entered light tunnel 23, so that the light beam emitted from light tunnel 23 has reduced luminance irregularities. Light tunnel 23 may be replaced with a prismatic or cylindrical rod lens, or a so-called rod integrator for reducing luminance irregularities. Usually, the light tunnel or the rod integrator has an outer profile which is similar to the outer profile of the image forming device of DMD 70.

The afocal optical system comprises three lenses including first lens 41, second lens 51, and third lens 61, and two reflecting mirrors including first planar mirror 62 and second planar mirror 63. The afocal optical system uses the exit end face of light tunnel 23 as an object surface thereof.

First planar mirror 62 and second planar mirror 63 as the reflecting mirrors only have the function of changing the optical path, and are not indispensable optical components of the afocal optical system. Therefore, the optical properties of the afocal optical system remain unchanged even if first planar mirror 62 and second planar mirror 63 are dispensed with. In the illustrated embodiment, first planar mirror 62 and second planar mirror 63 are disposed between second lens 51 and third lens 61 for the purpose of folding the optical path to reduce the size of projection display apparatus 1.

Figure 4:
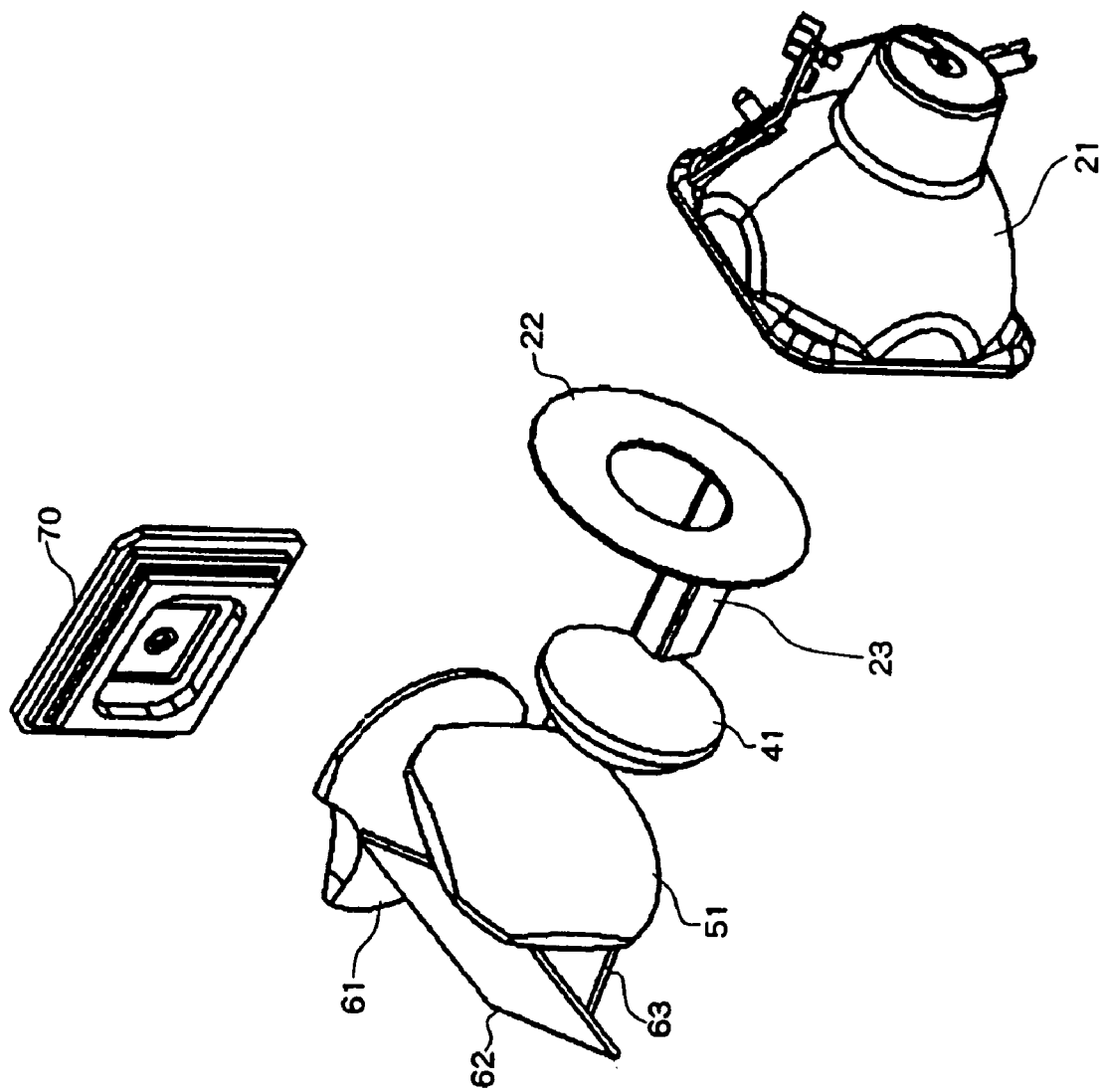
FIG. 4 is an exploded perspective view showing an optical layout of the optical unit.

Of the three lenses of the afocal optical system, first lens 41 comprises a plano-convex lens. First lens 41 has its planar surface facing light tunnel 23 and has its center disposed vertically off the optical axis extending through the center of light source unit 21 and the center of light tunnel 23. Second lens 51 also comprises a plano-convex lens with its center disposed vertically and horizontally off the optical axis, and has an optical axis angularly displaced as shown in FIG. 4. Third lens 61 comprises a convex lens with its center shifted from a line normal to the center of DMD 70, and has an optical axis angularly displaced. Third lens 61 serves to apply the light beam reflected from first planar mirror 62 and second planar mirror 63 to DMD 70.

The afocal optical system has an illumination surface (image surface) where DMD 70 is disposed as an image forming device.

Figure 2:
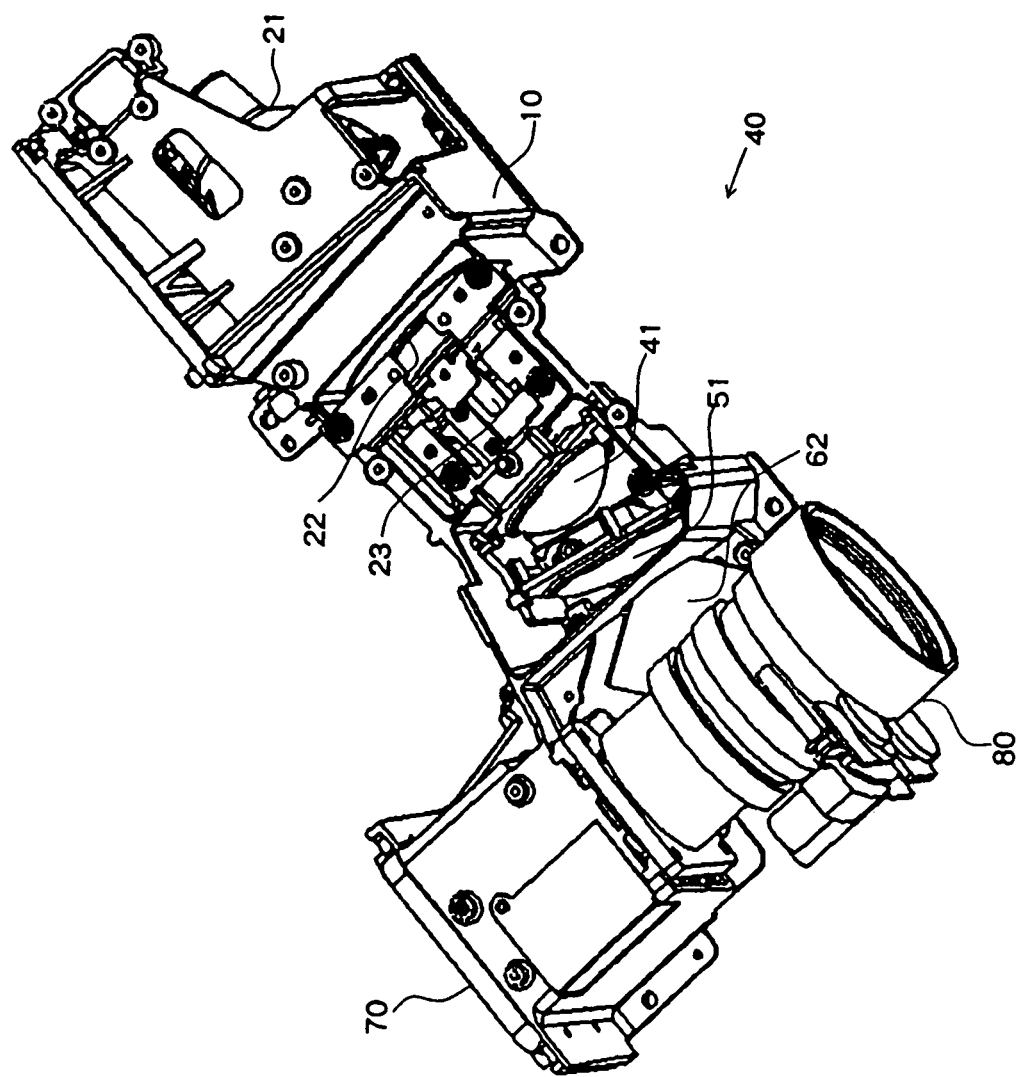
FIG. 2 is a perspective view of the optical unit incorporated in the projection display apparatus according to the embodiment of the present invention.

Specific structural details of optical unit 2 incorporated in projection display apparatus 1 will be described below with reference to FIG. 2. Optical unit 2 includes integrally formed unit base 10 made of magnesium which supports thereon light source unit 21, color wheel 22, light tunnel 23, first lens 41, second lens 51, first planar mirror 62, second planar mirror 63, third lens 61, DMD 70, and projection lens 80.

The light beam emitted from light source unit 21 travels successively through color wheel 22, light tunnel 23, first lens 41, second lens 51, first planar mirror 62, second planar mirror 63, and third lens 61 to DMD 70. The light beam applied to DMD 70 is reflected thereby and travels through projection lens 80 to screen 90 (see FIG. 1). At this time, the light beam applied to DMD 70 is modulated by an image signal to project an image represented by the image signal onto screen 90.

Figure 3:
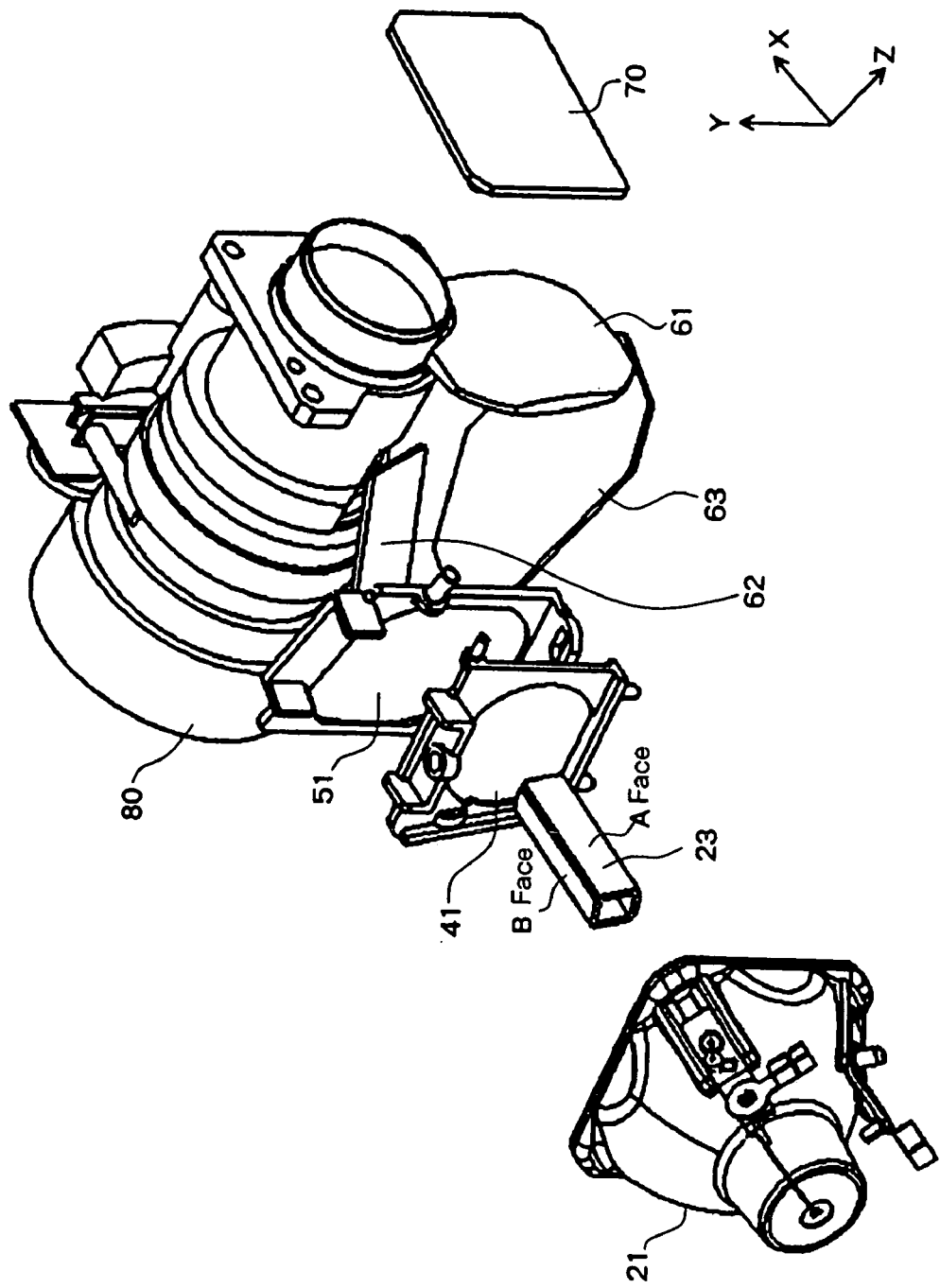
FIG. 3 is an exploded perspective view showing optical components of the optical unit.

A general layout of optical components of optical unit 2 will be described below with reference to FIG. 3. In FIG. 3, color wheel 22 is omitted from the illustration in order to show the shape of an end face of light tunnel 23. FIG. 3 shows the optical components in a coordinate system having X-, Y-, and Z-axes. The origin of the coordinate system is positioned at the center of DMD 70. The Z-axis extends along a line normal to DMD 70 and has a negative direction pointed toward projection lens 80. The Y-axis extends perpendicularly to the Z-axis and parallel to the shorter sides of DMD 70 and has the negative direction pointed upwards. The X-axis extends perpendicularly to the Z-axis and the Y-axis. DMD 70 as the image forming device lies on an X-Y plane. The light beam emitted from light source unit 21 travels substantially along the X-axis in its positive direction through color wheel 22 (not shown in FIG. 3) into light tunnel 23. Thereafter, the light beam passes through first lens 41 and second lens 51, then is caused by first planar mirror 62 to change its course downwards, i.e., in the negative direction along the Y-axis, and then caused by second planar mirror 63 to change its course obliquely upwards, passes through third lens 61, and is applied obliquely to DMD 70 from below. DMD 70 as the image forming device has a mirror surface lying parallel to the aperture of projection lens 80.

If a transmissive liquid crystal panel is employed as the image forming device, then it is necessary to apply a light beam substantially perpendicular to the transmissive liquid crystal panel. Therefore, the optical path (optical axis) from light source unit 21 to the transmissive liquid crystal panel lies in one plane. If DVD 70 is employed as the image forming device, then since the image forming device is of the reflective type, the light beam needs to be applied obliquely to DMD 70. Furthermore, inasmuch as it is necessary that the light beam applied to DMD 70 and a light beam reflected thereby be separated from each other, the optical path from light source unit 21 to DMD 70 is three-dimensional. This is how the optical structure employing the transmissive liquid crystal panel and the optical structure employing DMD 70 are different from each other. Because of this structural difference, the structural details of transmissive liquid crystal panel cannot be applied directly to the optical unit structure of the projection display apparatus which incorporates DMD 70.

Optically, the exist end face of light tunnel 23 and the reflecting surface of DMD 70 are in an image forming relationship to each other through the afocal optical system, and are substantially similar in shape to each other.

Figure 5:
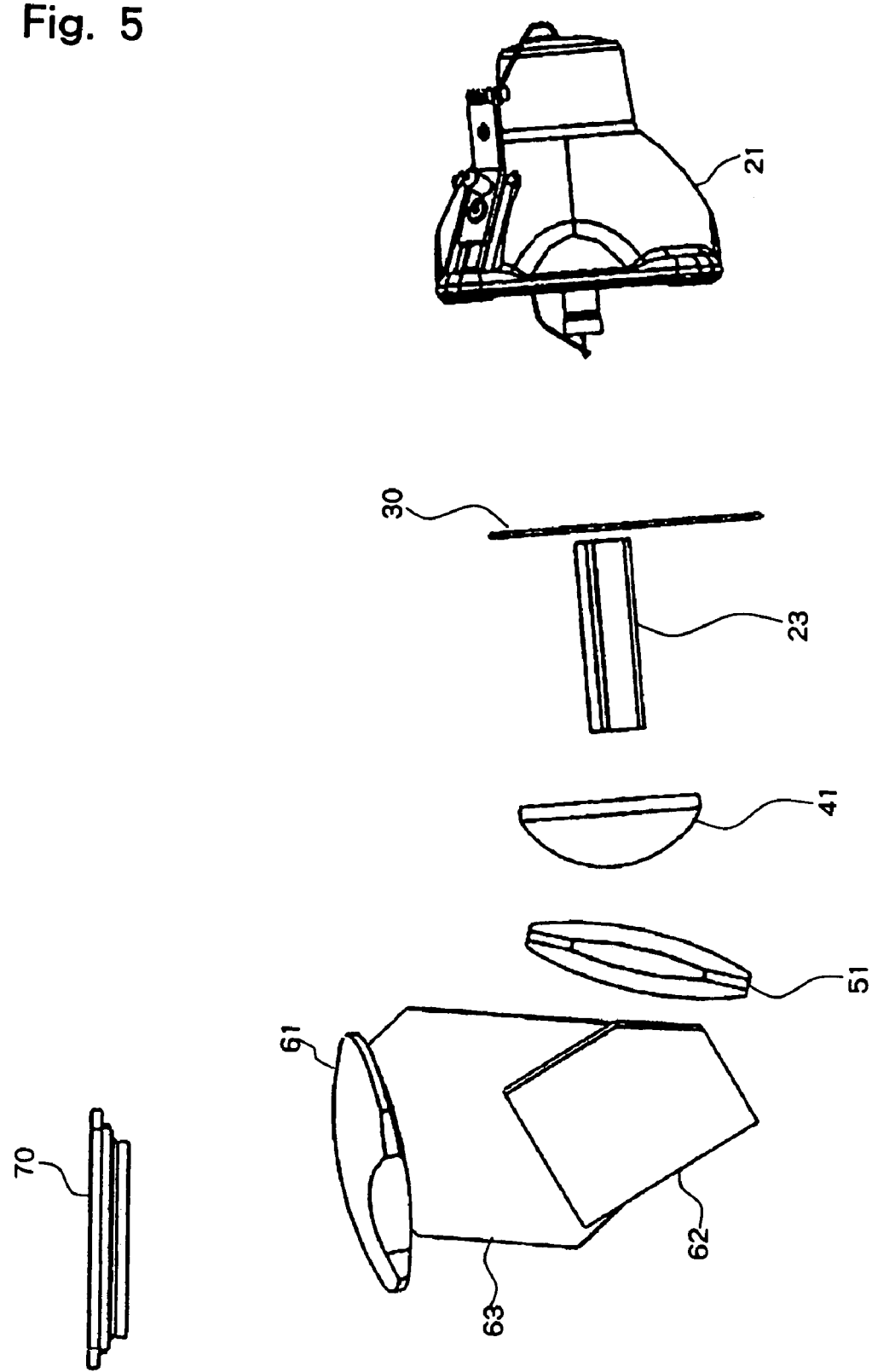
FIG. 5 is an exploded plan view showing the optical layout of the optical unit as viewed in a Y-axis direction shown in FIG. 3.

The optical layout of the optical components of optical unit 2 will be described below with reference to FIGS. 4 and 5. The afocal optical system of optical unit 2 is constructed of the three lenses including first lens 41, second lens 51, and third lens 61, and the two reflecting mirrors including first planar mirror 62 and second planar mirror 63, as described above. First planar mirror 62 and second planar mirror 63 serve to only change the path of the optical beam, and do not affect other optical properties including magnification and aberrations. Therefore, the afocal optical system is optically made up of first lens 41, second lens 51, and third lens 61. Each of first lens 41 and second lens 51 comprises a spherical lens of glass, and third lens 61 comprises an aspherical lens of plastic. First lens 41 has its center vertically shifted from the optical axis of light tunnel 23, which is aligned with a normal line passing through the center of the exit end face of light tunnel 23. Therefore, the center of first lens 41 is off-axis. Second lens 51 has its center vertically shifted from the optical axis of light tunnel 23, and has its optical axis angularly displaced. Therefore, the optical axis of second lens 51 does not extend parallel to the optical axis of light tunnel 23. Third lens 61 also has its optical axis angularly displaced. Third lens 61 has a large recess defined in a marginal edge thereof where no light beam passes. The recess defined in third lens 61 serves to prevent physical interference between third lens 61 and projection lens 80.

Figure 6A:
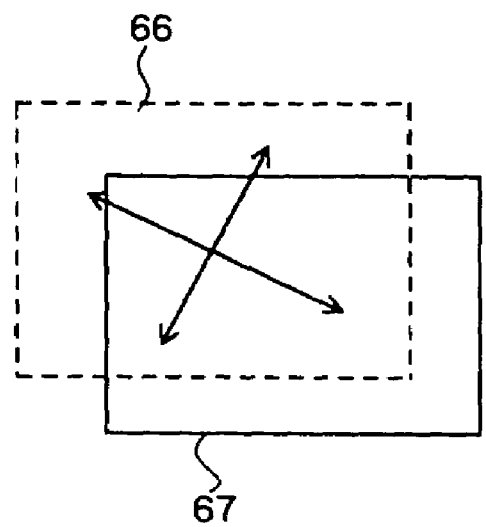
FIG. 6A is a diagram showing the relationship between an illuminating light area and an image forming area on a DMD at the time the illuminating light area is moved obliquely.
Figure 6B:
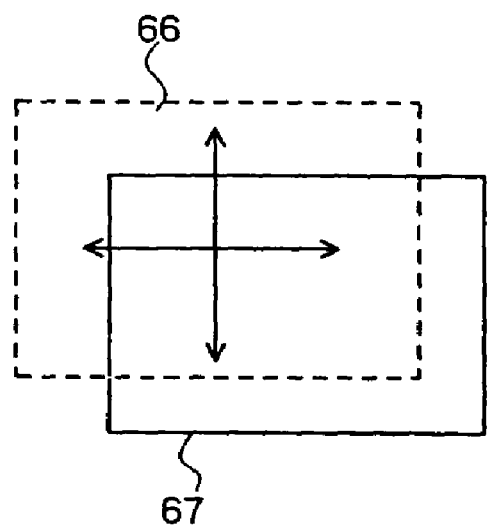
FIG. 6B is a diagram showing the relationship between the illuminating light area and the image forming area on the DMD at the time the illuminating light area is moved in vertical and horizontal directions.

FIGS. 6A and 6B are diagrams showing the relationship between illuminating light area 66 and image forming area 67 on DMD 70. FIG. 6A shows the relationship at the time illuminating light area 66 is moved obliquely, and FIG. 6B the relationship at the time illuminating light area 66 is moved in vertical and horizontal directions. In FIGS. 6A and 6B, illuminating light area 66 is indicated by the dotted lines, and image forming area 67 by the solid lines. Since illuminating light area 66 and image forming area 67 are not aligned with each other, they need to be adjusted into alignment with each other.

Since the three lenses, i.e., first lens 41, second lens 51, and third lens 61, are shifted off-axis and angularly displaced, as described above, even though the light beam is applied obliquely to DMD 70, illuminating light area 66 formed on DMD 70 essentially keeps the shape of the exit end face of light tunnel 23. Usually, illuminating light area 66 has an extra margin and is greater in size than image forming area 67 on DMD 70. However, it is necessary to positionally align illuminating light area 66 and image forming area 67 on DMD 70.

When first lens 41, second lens 51, and third lens 61 are moved, illuminating light area 66 is moved a distance depending on the distances by which first lens 41, second lens 51, and third lens 61 are moved, in a direction depending on the directions in which first lens 41, second lens 51, and third lens 61 are moved. The longer sides of the exit end face (or the entrance end face) of light tunnel 23 are inclined to the Y-axis direction shown in FIG. 3. When first lens 41 is moved in the vertical and horizontal directions, therefore, illuminating light area 66 is moved obliquely relative to image forming area 67, as indicated by the arrows in FIG. 6A. In order to bring illuminating light area 66 into accurate positional alignment with image forming area 67, illuminating light area 66 needs to be adjusted alternately in the vertical and horizontal directions many times, as shown in FIG. 6B. Such an adjustment process is inefficient as it is tedious and time-consuming. Another problem is that a moving mechanism combined with first lens 41 for moving the lens in the vertical and horizontal directions is complex in structure and large in size. In addition, the adjustment process for adjusting first lens 41 in the two mutually perpendicular directions is complex, making production efficiency low. These problems also apply to second lens 51. Third lens 61 aggravates the problems because of difficulty moving third lens 61 due to possible physical interference with projection lens 80.

According to the present invention, first lens 41 is combined with a mechanism for moving first lens 41 in directions substantially parallel to one side of the exit end face of light tunnel 41, and second lens 51 is combined with a mechanism for moving second lens 51 in directions substantially parallel to another side, adjacent to said one side, of exit end face of light tunnel 41. These mechanisms are effective to solve the problem about the directions in which the illuminating light area moves, the problem of the complex moving mechanisms, and production problems regarding the adjustment process. Details of the mechanisms will be described below with reference to FIGS. 7 through 11.

Figure 7:
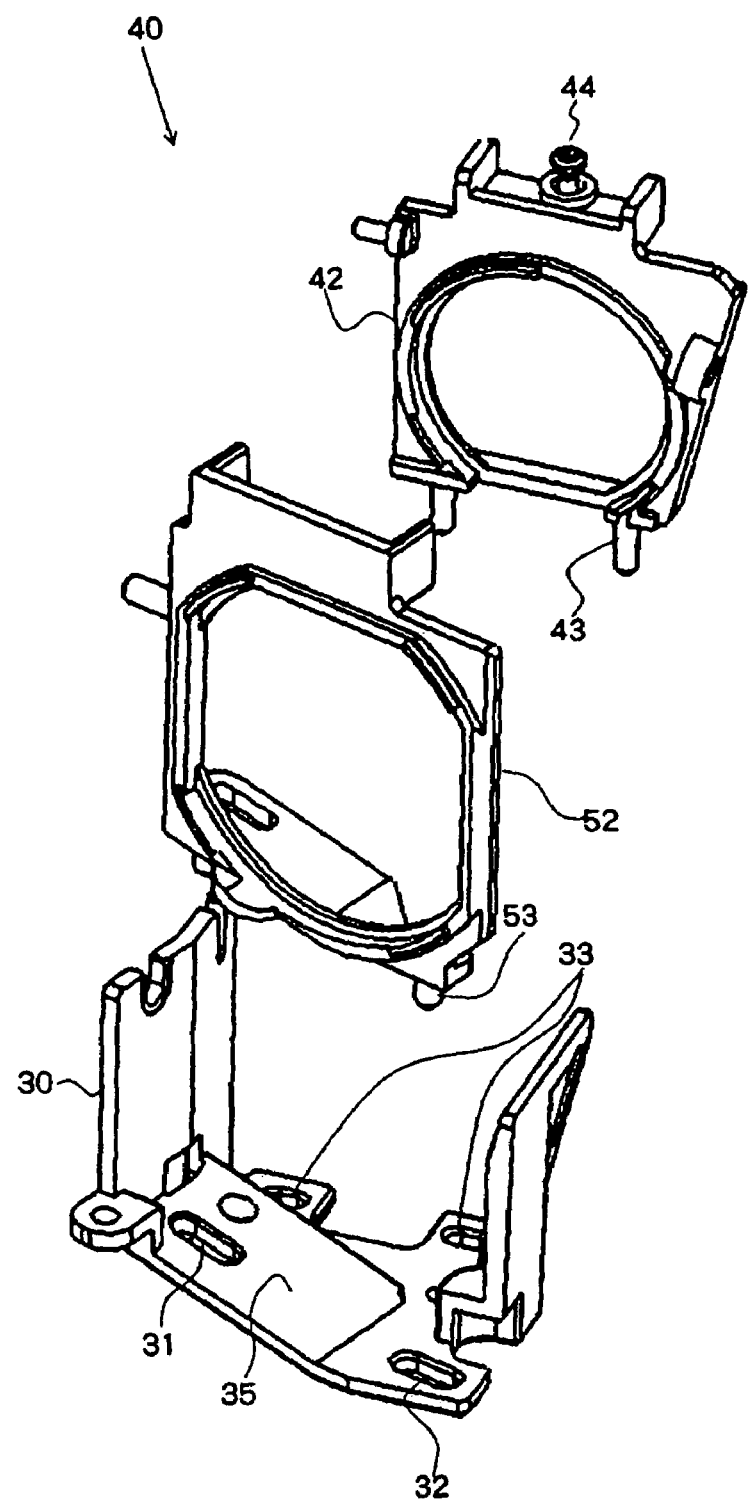
FIG. 7 is an exploded perspective view of the lens unit.

As shown in FIG. 7, lens unit 40 comprises first lens holder 42, second lens holder 52, lens base 30, and mechanisms for moving and fixing the lens holders. First lens holder 42 holds first lens 41, and second lens holder 52 holds second lens 51. First lens holder 42 and second lens holder 52 are movably supported on lens base 30, which is fixed to unit base 10.

Figure 8A:
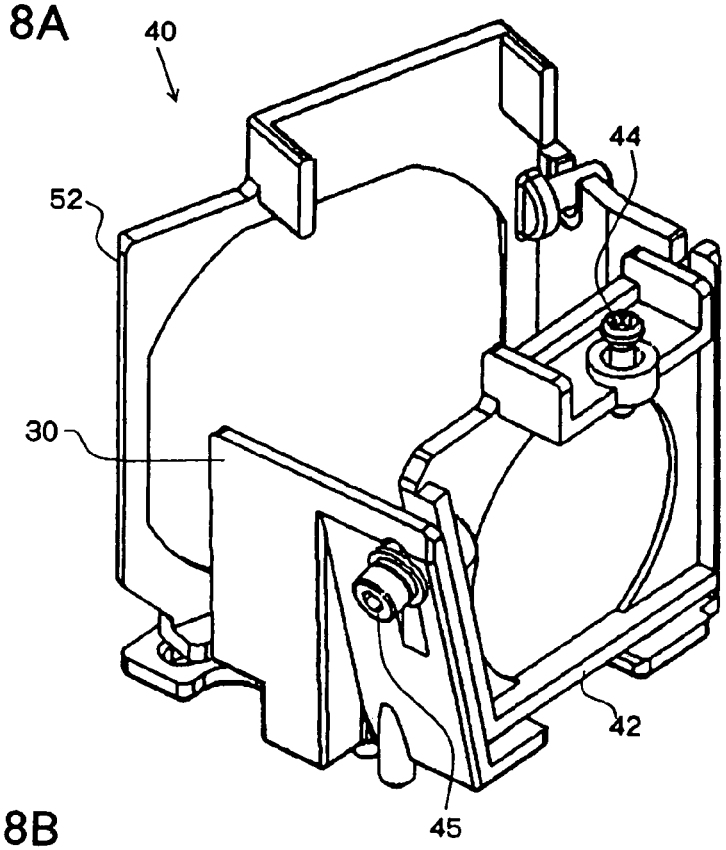
FIG. 8A is a perspective view of the lens unit as viewed from a first lens.
Figure 8B:
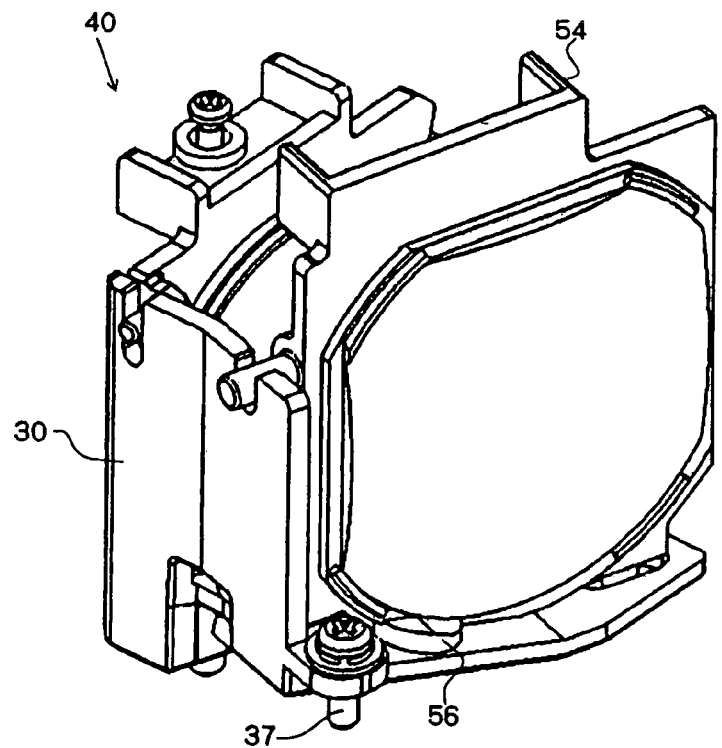
FIG. 8B is a perspective view of the lens unit as viewed from a second lens.
Figure 9:
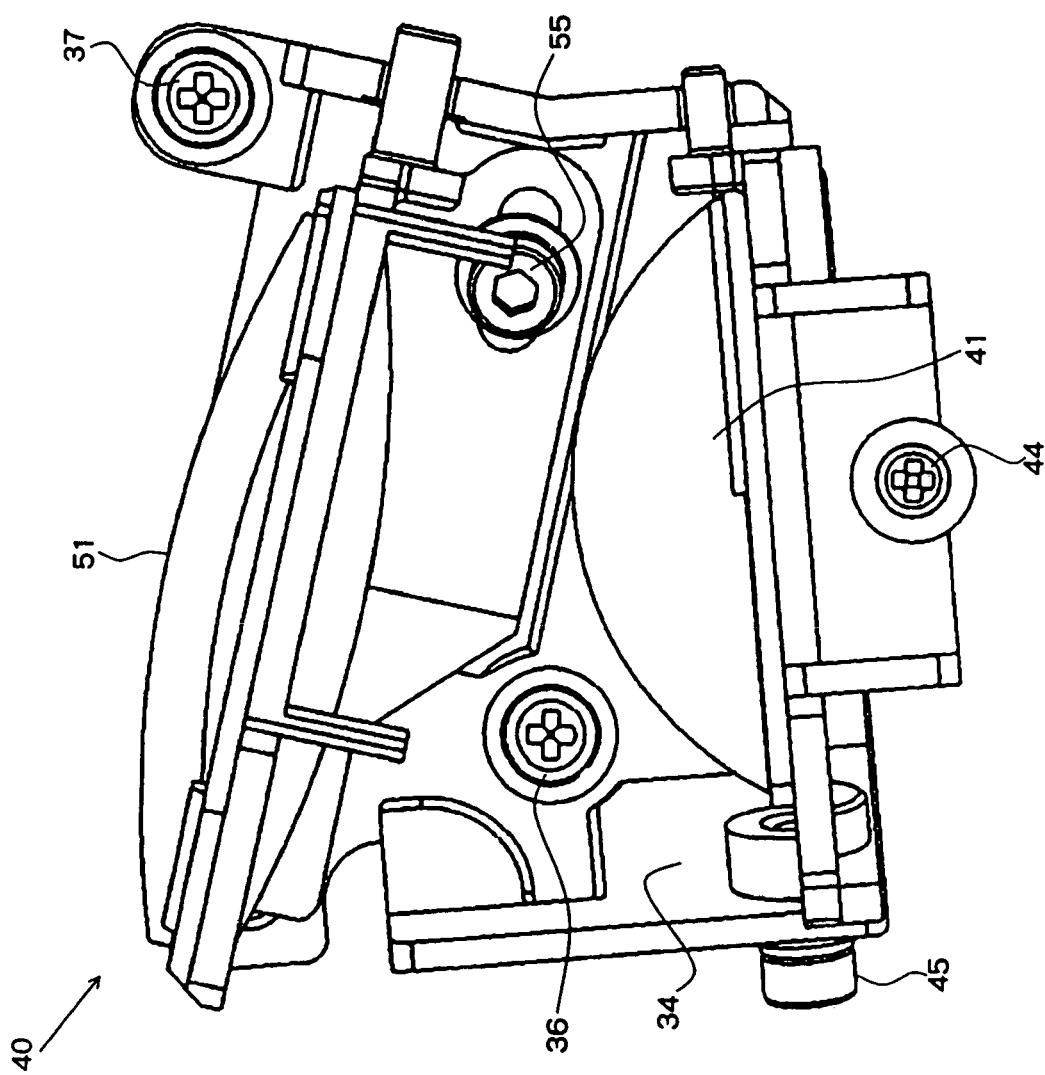
FIG. 9 is a plan view of the lens unit.
Figure 10:
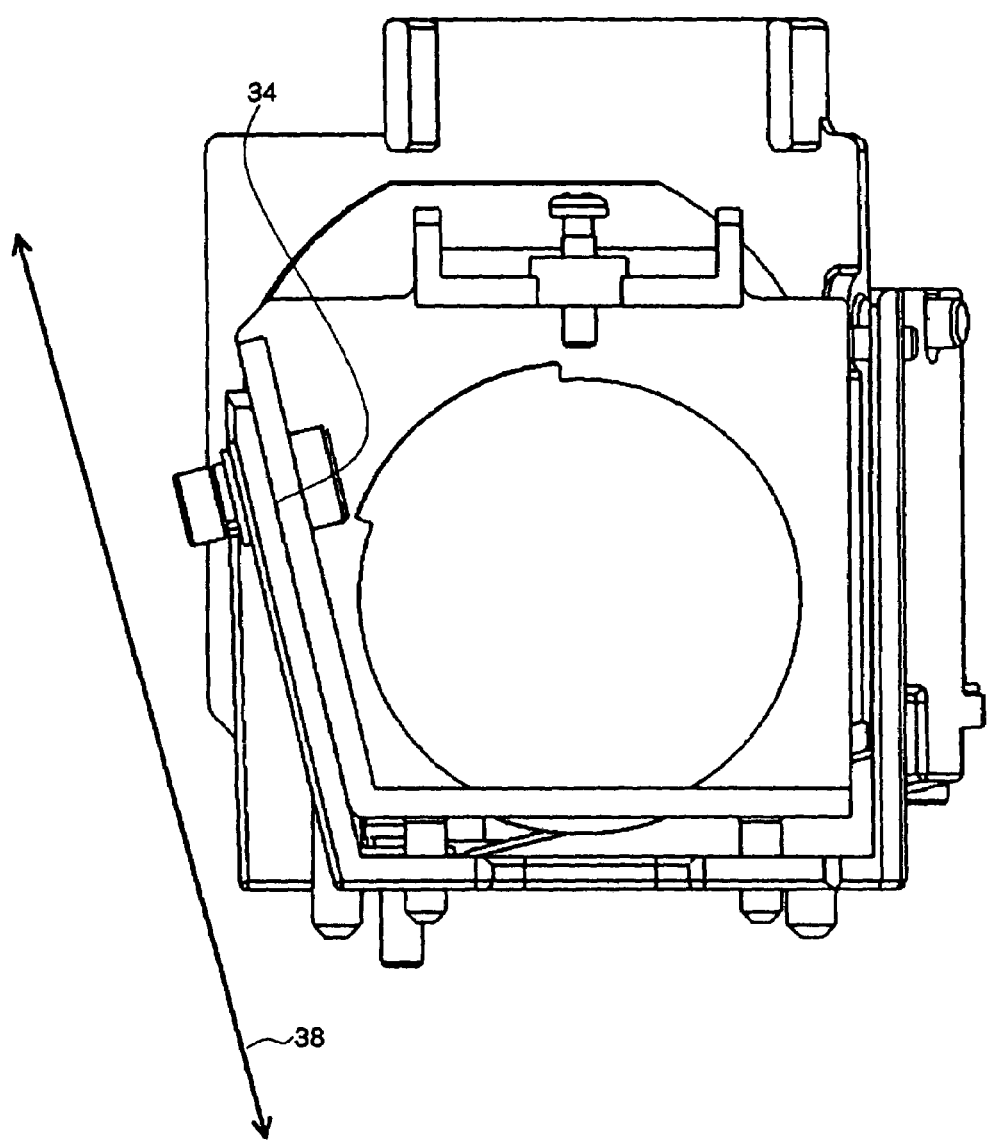
FIG. 10 is a front elevational view of the lens unit as viewed from the first lens.
Figure 11:
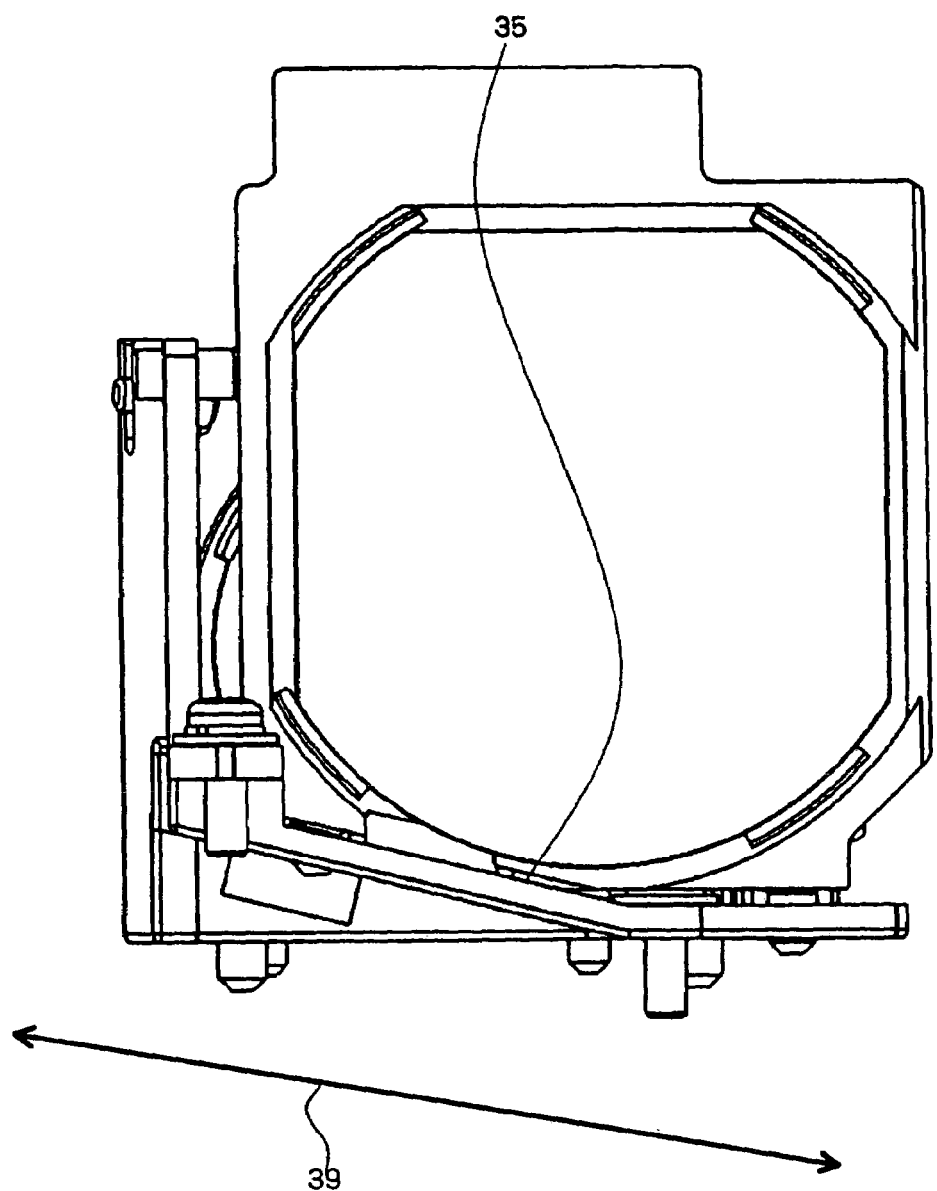
FIG. 11 is a front elevational view of the lens unit as viewed from the second lens.

As shown in FIGS. 7 through 9, first lens holder 42 and second lens holder 52 are fastened to lens base 30 respectively by first fixing screw 45 (see FIGS. 8A and 9) and second fixing screw 55 (see FIG. 9).

First lens holder 42 has two first lens guide pins 43 projecting downwardly from respective left and right areas of a lower surface thereof. First lens guide pins 43 are inserted in respective horizontally oblong guide holes 33 defined in lens base 30, and serve as guides for first lens 41 to move vertically, obliquely in unison with first lens holder 42. First lens guide pins 43 are guided in directions parallel to the principal plane of first lens 41.

Second lens holder 52 also has two second lens guide pins 53 projecting downwardly from respective left and right areas of a lower surface thereof. The function and structure of second lens guide pins 53 are the same as those of first lens guide pins 43 of first lens holder 42. Second lens holder 52 engage in respective horizontally oblong guide holes 31, 32 defined in lens base 30, and are guided in directions parallel to the principal plane of second lens 51.

Figure 12:
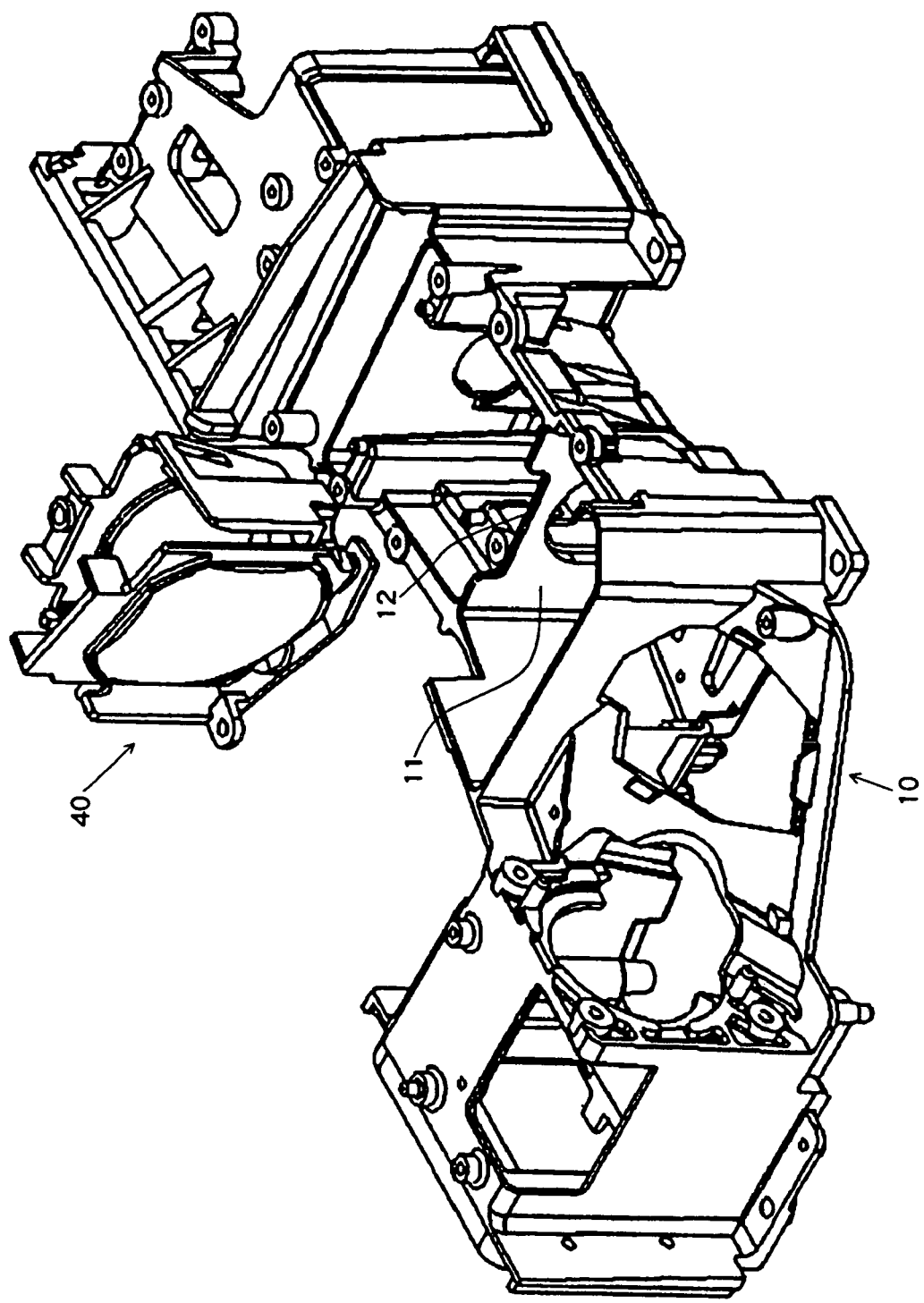
FIG. 12 is a perspective view showing the manner in which the lens unit and a unit base are assembled together.

As shown in FIG. 12, lens unit 40 is inserted in unit base 10 and fixed thereto by lens base fixing screw 37 (see FIG. 8B). Unit base 10 comprises a rigid die casting of magnesium and is substantially in the form of a bath tub. Therefore, lens unit 40 and a light tunnel unit can be assembled from above into unit base 10. Unit base 10 which is in the form of a rigid bath tub is highly torsion-resistant and allows optical components to be assembled into position with high accurately. When the optical components assembled in unit base 10 are moved under applied external force for positional adjustment, unit base 10 is prevented from being deformed and the optical path provided by the optical components is not distorted. Unit base 10 made of magnesium is highly resistant to thermal deformations and is highly durable while in use at high temperatures.

Positional adjustment of illuminating light area 66 will be described below. First lens holder 42 and second lens holder 52 are movable only uniaxially by a combination of first lens guide pins 43 and guide holes 33 and a combination of second lens guide pins 53 and guide holes 31, 32, as described below.

First lens holder 42 is movable along first holder moving surface 34 (see FIGS. 9 and 10) in first lens moving direction 38 (see FIG. 10) which is substantially aligned with the direction of the longer sides of light tunnel 23. First lens moving surface 34 lies parallel to surface A (see FIG. 3) of light tunnel 23 and also parallel to the optical axis of light tunnel 23. Light tunnel 23 is positioned on unit base 10 by a light tunnel holder. Similarly, first lens holder 42, i.e., first lens 41, is positioned on unit base 10 by lens base 30. Light tunnel 23 and first lens holder 42, i.e., first lens 41, are highly accurately positioned with respect to unit base 10 as a common positioning reference. Accordingly, the direction of the longer sides of the exit end face of light tunnel 23 and the moving directions of first lens holder 42 are aligned with each other.

Second lens holder 52 is movable along second holder moving surface 35 (see FIG. 11) in second holder moving direction 39 which lies in the same plane as the lens plane of second lens 51. Second holder moving direction 39 is not perpendicular to the optical axis of light tunnel 23 because the optical axis of second lens 51 is angularly displaced from the optical axis of light tunnel 23. If the moving directions of second lens 51 are perpendicular to the optical axis of light tunnel 23, then the focused position of the exit end face of light tunnel 23 in the image forming surface changes, resulting in a deformation of illuminating light area 66 (FIGS. 6A and 6B) that has been focused in its entirety. Since illuminating light area 66 is deformed out of a quadrangular shape, the light utilization efficiency is undesirably lowered by the deformation. Accordingly, second lens 51 has to be moved in its lens plane (principal plane). Therefore, a line of intersection between a plane including surface B (see FIG. 3) of light tunnel 23 and the principal plane of second lens 51 is determined, and a surface which is parallel to the line of intersection and perpendicular to the principal plane of second lens 51 is used as second holder moving surface 35. Though second holder moving surface 35 should preferably be parallel to the line of intersection, second holder moving surface 35 may be substantially parallel to the line of intersection. When second lens holder 52 is moved along second holder moving surface 35, the moving direction of illuminating light area 66 is substantially aligned with the direction of the shorter sides of light tunnel 23.

If first lens 41 has its optical axis angularly displaced from the optical axis of light tunnel 23, then the moving direction of first lens 41 may be determined in the same manner as with second lens 51. In addition, even if the optical axis of first lens 41 is not angularly displaced from the optical axis of light tunnel 23, a line of intersection between a plane including surface A of light tunnel 23 and the principal plane of first lens 41 may be determined, and a surface which is parallel to the line of intersection and perpendicular to the principal plane of first lens 41 may be used as first holder moving surface 34. Though first holder moving surface 34 should preferably be parallel to the line of intersection, first holder moving surface 34 may be substantially parallel to the line of intersection.

Finally, a process of moving first lens 41 and second lens 51 will be described below. Lens unit 40 is assembled in unit base 10 and fastened to unit base 10 by lens base fixing screw 36 (FIG. 9) and lens base fixing screw 37 (FIG. 8B).

To move first lens 41, first fixing screw 45 (FIG. 8A) is loosened first, allowing first lens 41 and first lens holder 42 to move with respect to lens base 30. Then, first lens adjustment screw 44 is turned. When first lens adjustment screw 44 is turned clockwise, it is brought into contact with screw bearing surface 12 (see FIG. 12) of partition wall 11 of unit base 10. When first lens adjustment screw 44 is further turned clockwise, first lens holder 42 is moved upwards along first holder moving surface 34 while being supported by screw bearing surface 12 against which first lens adjustment screw 44 is held. Since the direction in which first lens holder 42 is moved is the same as the direction of the longer sides of the exit end face of light tunnel 23, illuminating light area 66 is moved in the direction of the longer sides of image forming area 67 on DMD 70. Illuminating light area 66 is now brought into a desired position. After it is confirmed that illuminating light area 66 has reached the desired position, first lens fixing screw 45 (FIG. 8A) is tightened to fasten first lens holder 42 to lens unit 40.

Then, second fixing screw 55 (FIG. 9) is loosened, allowing second lens holder 52 with second lens 51 held thereby to move with respect to lens base 30. Second lens adjustment grip 54 (FIG. 8B) is gripped, and second lens holder 52 is moved. At this time, second lens guide pins 53 are guided by guide holes 31, 32, and second lens holder foot 56 (FIG. 8B) on the lower surface of second lens holder 52 is moved along second holder moving surface 35 (FIGS. 7 and 11), thereby moving second lens 51. At this time, second lens holder foot 56 is effective to prevent the principal plane of second lens 51 from being tilted. Therefore, illuminating light area 66 is prevented from being brought out of focus and can easily be positioned. Since the direction in which illuminating light area 66 is moved is the same as the direction of the shorter sides of the exit end face of light tunnel 23, illuminating light area 66 is moved along the shorter sides of image forming area 67 on DMD 70 and hence can easily be positioned. Illuminating light area 66 is now brought into a desired position. After it is confirmed that illuminating light area 66 has reached the desired position, second lens fixing screw 55 is tightened to fasten second lens holder 52 to lens base 30.

According to the above process, illuminating light area 66 is accurately positioned into alignment with image forming area 67 on DMD 70 as the image forming device. Because illuminating light area 66 can accurately be brought into alignment with image forming area 67 by moving first lens 41 and second lens 51 as described above, the efficiency with which illuminating light area 66 can be adjusted is high, and high production efficiency is achieved. Optical unit 2 provides a high light utilization efficiency, and projection display apparatus 1 incorporating optical unit 2 can be adjusted highly efficiently.

The process of moving the first lens and the second lens is not limited to the structure and process described above. The first optical element (first lens) moving unit may have a moving mechanism for moving the first optical element on a first principal plane thereof in a direction parallel to a plane including a first surface of the light tunnel, and the second optical element (second lens) moving unit may have a moving mechanism for moving the second optical element on a second principal plane thereof in a direction parallel to a plane including a second surface of the light tunnel.

While a preferred embodiment of the present invention has been described using specific terms, such description is for illustrative purposes only, and it is to be understood that changes and variations may be made without departing from the spirit or scope of the following claims.

What is claimed is:

1. An optical unit for use in a projection display apparatus, comprising a light source unit, a rectangular optical element, a first optical element, a second optical element, a first optical element moving unit for moving the first optical element, a second optical element moving unit for moving the second optical element, and an image forming device, wherein said rectangular optical element has a first surface disposed between an entrance face and an exit face and a second surface disposed adjacent to said first surface;

a light beam emitted from said rectangular optical element is applied to said first optical element;

a light beam emitted from said first optical element is applied to said second optical element;

said first optical element moving unit has a moving mechanism for moving said first optical element on a first principal plane thereof perpendicular to the optical axis of said first optical element in a direction parallel to a line of intersection between a plane including said first surface of said rectangular optical element and said first principal plane; and said second optical element moving unit has a moving mechanism for moving said second optical element on a second principal plane thereof perpendicular to the optical axis of said second optical element in a direction parallel to a line of intersection between a plane including said second surface of said rectangular optical element and said second principal plane.

2. The optical unit according to claim 1, further comprising a common structure, wherein said first optical element moving unit and said second optical element moving unit are mounted on said common structure.

3. The optical unit according to claim 1, wherein said moving mechanism of said first optical element moving unit has a first optical element holding member holding said first optical element and a first moving member;

said first optical element holding member has a sliding surface slidable on a first optical element moving surface which extends substantially parallel to said line of intersection between the plane including said first surface of said rectangular optical element and said first principal plane of said first optical element and which is perpendicular to said first principal plane;

said first moving member moves said sliding surface of said first optical element holding member on said first optical element moving surface in a direction parallel to said first principal plane;

said moving mechanism of said second optical element moving unit has a second optical element holding member holding said second optical element and a second moving member;

said second optical element holding member has a sliding surface slidable on a second optical element moving surface which extends substantially parallel to said line of intersection between the plane including said second surface of said rectangular optical element and said second principal plane of said second optical element and which is perpendicular to said second principal plane; and said second moving member moves said sliding surface of said second optical element holding member on said second optical element moving surface in a direction parallel to said second principal plane;

said optical unit further comprising:

a common structure, wherein said first optical element moving unit and said second optical element moving unit are mounted on said common structure, said first optical element moving surface and said second optical element moving surface being disposed on said common structure.

4. The optical unit according to claim 3, wherein said first moving member comprises:

two guide pins mounted on said first optical element holding member and inserted respectively in two guide holes defined in a bottom surface of said common structure for guiding said guide pins in a direction parallel to said first primary plane;

a fixing screw mounted on said sliding surface of said first optical element holding member for fixing said sliding surface to said first optical element moving surface on said common structure; and an adjustment screw mounted on said first optical element holding member and having a tip end held in contact with an upper surface of said common structure for adjusting the positional relationship between said first optical element holding member and said common structure; and wherein said second moving member comprises:

two guide pins mounted on said second optical element holding member and inserted respectively in two guide holes defined in a bottom surface of said common structure for guiding said guide pins in a direction parallel to said second primary plane;

a fixing screw mounted on said sliding surface of said second optical element holding member for fixing said sliding surface to said second optical element moving surface on said common structure; and an adjustment grip mounted on said second optical element holding member for moving said sliding surface of said second optical element holding member slidably on said second optical element moving surface on said common structure.

5. The optical unit according to claim 1, wherein said first optical element and said second optical element have respective optical axes displaced off the optical axis of said rectangular optical element.

6. The optical unit according to claim 1, wherein said rectangular optical element comprises a light tunnel.

7. The optical unit according to claim 1, wherein said image forming device comprises a digital micromirror device.

8. A projection display apparatus comprising an optical unit according to claim 1.

* * * * *